United States Patent
Pucher et al.

(10) Patent No.: US 7,475,489 B2
(45) Date of Patent: Jan. 13, 2009

(54) SCANNING SYSTEM OF A POSITION MEASURING DEVICE

(75) Inventors: Wolfgang Pucher, Bergen (DE); Reinhard Mayer, Traunstein (DE); Stefan Kühnhauser, Taching am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 175 days.

(21) Appl. No.: 11/657,509

(22) Filed: Jan. 24, 2007

(65) Prior Publication Data

US 2007/0180724 A1 Aug. 9, 2007

(30) Foreign Application Priority Data

Feb. 3, 2006 (DE) .................. 10 2006 004 898

(51) Int. Cl.
*G01D 5/347* (2006.01)
*G01B 11/00* (2006.01)
(52) U.S. Cl. .................. 33/706; 33/702; 356/616; 250/237 G
(58) Field of Classification Search .......... 33/702–706, 33/1 M
See application file for complete search history.

(56) References Cited

U.S. PATENT DOCUMENTS

| 3,816,003 | A | * | 6/1974 | Litke | 356/395 |
|---|---|---|---|---|---|
| 4,273,447 | A | * | 6/1981 | Nelle | 356/619 |
| 4,892,416 | A | | 1/1990 | Hassler, Jr. et al. | 384/58 |
| 4,972,599 | A | * | 11/1990 | Ernst | 33/706 |
| 5,760,392 | A | | 6/1998 | Hisamoto et al. | 250/237 G |
| 5,832,616 | A | * | 11/1998 | Fiedler | 33/706 |
| 6,742,274 | B2 | * | 6/2004 | Kawada | 33/702 |
| 6,810,601 | B2 | * | 11/2004 | Tondorf | 33/706 |
| 7,289,229 | B2 | * | 10/2007 | Otsuka | 356/616 |
| 7,299,564 | B2 | * | 11/2007 | Brandl | 33/707 |
| 2007/0180724 | A1 | * | 8/2007 | Pucher et al. | 33/706 |

FOREIGN PATENT DOCUMENTS

DE 25 05 587 A1 8/1976
DE 103 11 111 A1 9/2004

OTHER PUBLICATIONS

Yim-Bun Patrick Kwan et al., "Maβarbeit—Nanometergenaue Positionmessung in allen Freiheitsgraden," F & M—Messtechnik, vol. 108, No. 9, 2000, pp. 60-64.

* cited by examiner

*Primary Examiner*—G. Bradley Bennett
*Assistant Examiner*—Amy Cohen Johnson
(74) *Attorney, Agent, or Firm*—Brinks Hofer Gilson & Lione

(57) ABSTRACT

A scanning system of a position measuring device for photoelectric scanning of a measuring graduation, the scanning system including a support carrying measuring components, an adapter including a scanning graduation in a graduation plane and a holder that holds the support on the adapter. The holder is structured so that the support is stationarily positioned on the adapter in six degrees of freedom, but compensates thermally caused expansion of the support in relation to the adapter in a first coordinate direction and a second direction which define the graduation plane.

17 Claims, 4 Drawing Sheets

SCANNING SYSTEM OF A POSITION MEASURING DEVICE

Applicants claim, under 35 U.S.C. § 119, the benefit of priority of the filing date of Feb. 3, 2006 of a German patent application, copy attached, Serial Number 10 2006 004 898.9, filed on the aforementioned date, the entire contents of which is incorporated herein by reference.

BACKGROUND

1. Field of the Invention

The present invention relates to a scanning system of a position measuring device for photo-electric scanning of a measuring graduation.

2. Discussion of Related Art

The scanning system of a position measuring device for photo-electric scanning of a measuring graduation has a support with components. The components are, for example, optical components for guiding a scanning light beam, wherein guiding can be deflection, collimation or splitting, or, for example, electrical components, such as detector elements for the conversion of the scanning light beam into electrical scanning signals. In the course of a relative movement of a scanning graduation of the scanning system in relation to the measuring graduation the scanning light beam is modulated as a function of the position. For position measuring, the scanning system is fastened on a first one of the objects to be measured, and the measuring graduation on a second one of the objects to be measured which can be moved in relation to the first one. For a highly accurate position measurement it is necessary that the scanning light beam be exclusively modulated as a result of a relative movement of the objects to be measured. Thermal influences on the scanning system should not affect the position measurement.

OBJECTS AND SUMMARY OF THE INVENTION

It is therefore an object of the present invention to create a scanning system or a position measuring device which are designed in such a way that the position measurement is not, or only negligibly, distorted by thermal influences.

This object is attained by a scanning system of a position measuring device for photo-electric scanning of a measuring graduation, the scanning system including a support carrying measuring components, an adapter including a scanning graduation in a graduation plane and a holder that holds the support on the adapter. The holder is structured so that the support is stationarily positioned on the adapter in six degrees of freedom, but compensates thermally caused expansion of the support in relation to the adapter in a first coordinate direction and a second direction which define the graduation plane.

This object is also attained by a position measuring device that includes a measuring graduation and a scanning system for photoelectrically scanning the measuring graduation. The scanning system a support carrying measuring components, an adapter including a scanning graduation in a graduation plane and a holder that holds the support on the adapter. The holder is structured so that the support is stationarily positioned on the adapter in six degrees of freedom, but compensates thermally caused expansion of the support in relation to the adapter in a first coordinate direction and a second direction which define the graduation plane.

Advantages of the present invention will be discussed in the following description. An exemplary embodiment of the present invention will be described in greater detail by making reference to the drawings.

DETAILED DESCRIPTION OF THE PREFERRED EMBODIMENTS

Figure 1:
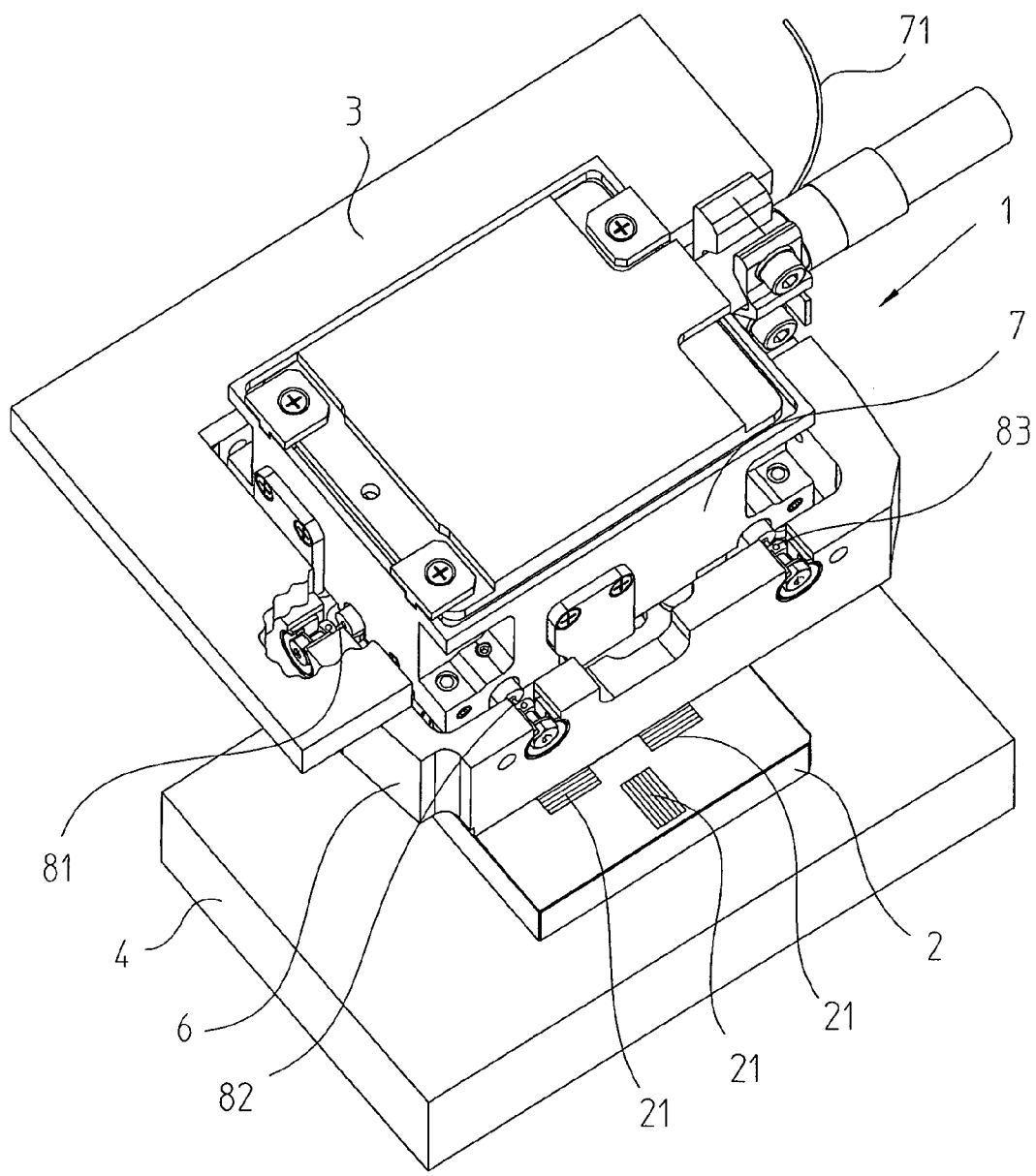
FIG. 1 shows a perspective view of an embodiment of a position measuring device with a scanning system designed in accordance with the present invention.
Figure 1:
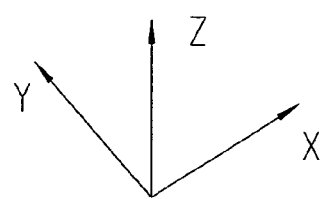
Figure 2:
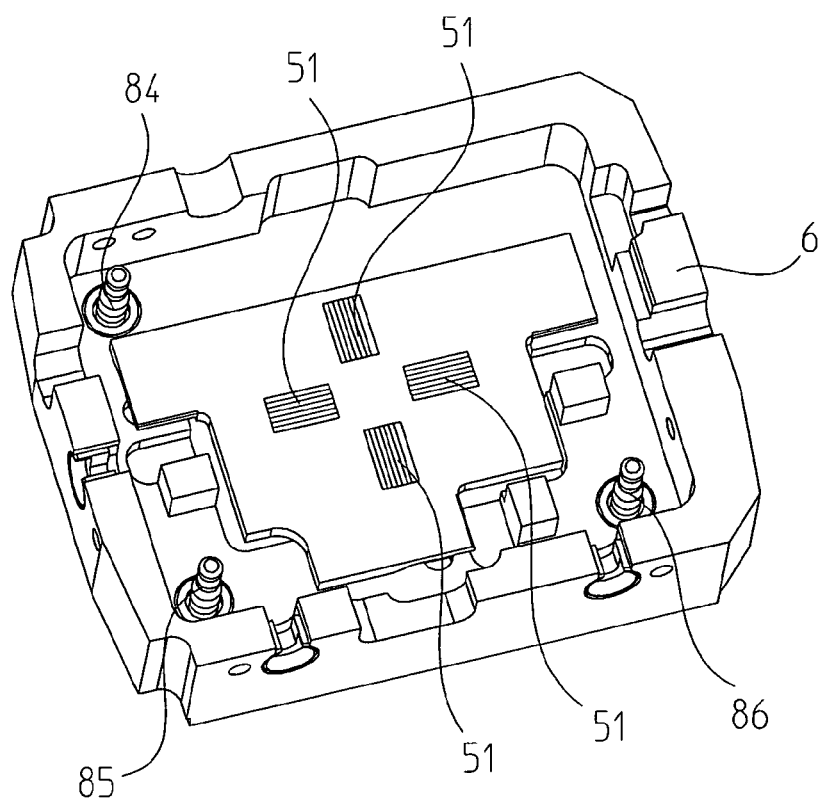
FIG. 2 shows a perspective view of an embodiment of an adapter with a scanning graduation to be used with the scanning system in accordance with FIG. 1 in accordance with the present invention.
Figure 3:
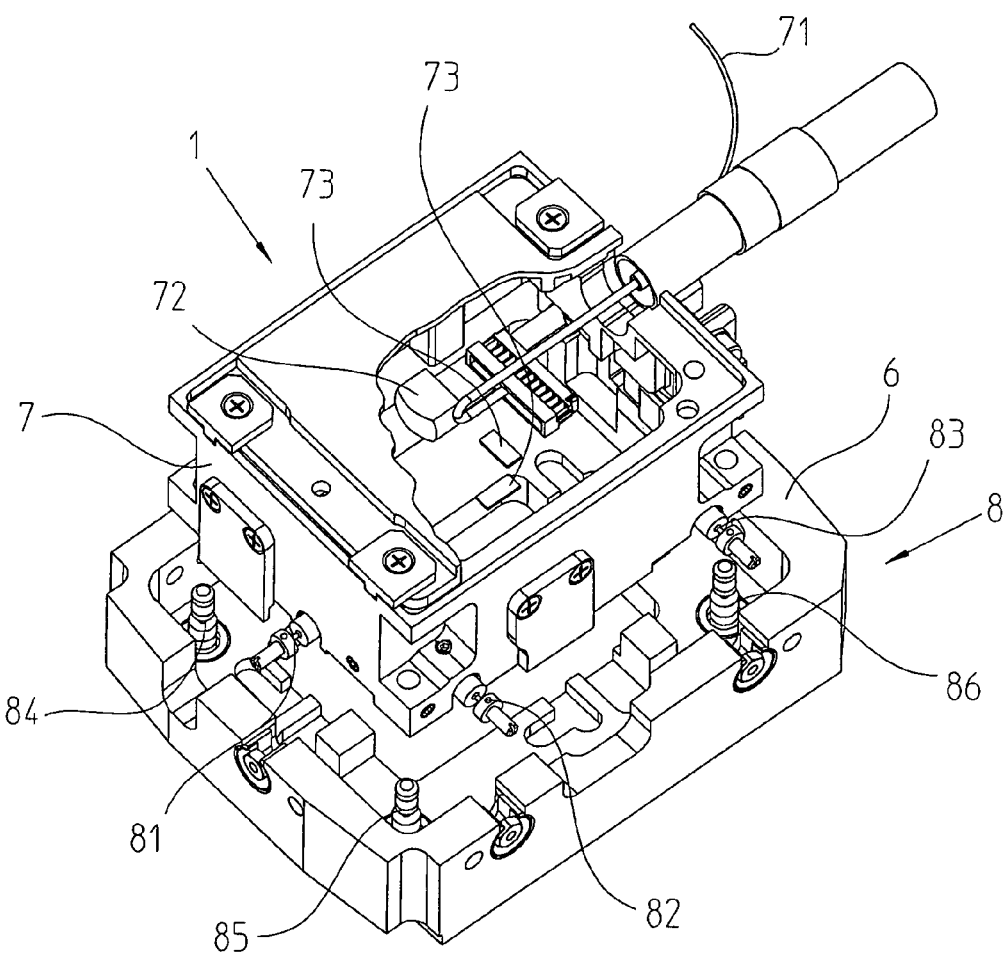
FIG. 3 represents a partial sectional view of the scanning system in accordance with FIG. 1.

A linear, two-dimensionally measuring position measuring device, having a scanning system 1 for photo-electric scanning of a measuring graduation 21 of a scale 2, is represented in FIGS. 1 to 3.

In the example represented, the position measuring device is used for two-dimensional incremental position measuring (X- and Y-directions) of two objects 3 and 4, which can be moved in relation to each other. For this purpose, in a known manner, the measuring graduation 21 has fields with graduation marks extending in the X-direction, as well as extending in the Y-direction.

Photo-electric scanning is based on detecting the displacement of the measuring graduation 21 relative to the scanning graduation 51. A scanning light beam is employed for this purpose, which is influenced by the scanning graduation 51, as well as the measuring graduation 21, and is modulated as a function of the position. Thus, the measuring circuit extends, starting at the first object 3, via the scanning graduation 51 to the measuring graduation 21 to the second object 4. Thermal influences must not cause relative displacements of the scanning graduation 51 relative to the measuring graduation in this portion of the measuring circuit.

For this purpose the scanning graduation 51 is assigned in a stationary manner to an adapter 6 in accordance with the present invention. In the represented example, the scanning graduation 51 has been applied to a scanning plate 5, and this scanning plate 5 has been fastened in a stationary manner to the adapter 6. This fastening can be non-positive or a positive fastening, for example by clamping or direct bonding—also called direct contacting, optical contacting or wringing. Alternatively, the scanning graduation 51 can also be directly applied to the adapter 6, in which case the adapter 6 constitutes the scanning plate 5.

The adapter 6 of the scanning system 1 is available to the user for stationary installation, for example by screwing, clamping or direct bonding (also called direct contacting, optical contacting or wringing) the scanning system 1 on the object 3 to be measured.

Beside the scanning graduation 51, the scanning system 1 contains yet further measuring components, in particular optical and/or electrical components, for the guidance and/or conversion of the scanning light beam. These optical and electrical components are fastened on a support 7. Some of these optical or electrical components have been schematically represented in the exemplary embodiment, an optical waveguide 71 for guiding light to the scanning system 1, lenses 72, or mirrors, for further guidance and shaping of the scanning light beam, as well as detector elements 73 for the conversion of the scanning light beam into position-dependent electrical scanning signals. Further parts required for scanning or for holding these components, such as optical splitters, splitting gratings, polarizers or printed circuit boards, can also be fastened on the support 7.

The support 7 with the optical or electrical components 71, 72, 73 is maintained on the adapter 6 by a holder 8. This holder 8 is embodied in such a way that the support 7 is positioned stationarily in six degrees of freedom on the adapter 6, but compensates thermally caused expansions of the support 7 in relation to the adapter 6. It is assured by this that expansions or distortions of the support 7 caused by temperature changes are not transmitted to the adapter 6, and therefore to the scanning graduation 51.

Components which do not negatively affect the position of the scanning graduation 51 in case of temperature changes can also be directly fastened on the adapter 6 in a manner not represented. It is thus possible, for example, to directly bond (also called directly contacting, optically contacting or wringing) optical components made of the same material as the adapter 6 to the adapter.

Expansions, and therefore linear changes, of the support 7 relative to the adapter 6 can have their cause in that different materials are being used or that different temperatures act thereon. Thus, the adapter 6 with the scanning graduation 51 can be made of a glass-ceramic material having a negligible coefficient of expansion, and the support 7 can be made of metal. Metal may be required because the support 7 as the housing of opto-electrical components, such as detector elements 73, provides shielding against electromagnetic radiation, or shields the lenses 72, as well as glued portions, from harmful optical radiation, for example UV radiation. It is advantageous if the solid state joints 81 to 86 are designed to be rod-shaped and are rigid in a longitudinal axis of the rod, but can be deflected in directions perpendicular thereto. It is also advantageous if at least one solid state joint 81, 82, 83, 84, 85, 86 extends in one of the three coordinate directions X, Y, Z, and fixes the adapter 6 rigidly on the support 7 in this coordinate direction X, Y, Z, but maintains it deflectably in the two other coordinate directions X, Y, Z.

The support 7 is made, for example, of an alloy made under the trademark INVAR by Imphy Alloys of Acieries D'Imphy, France, and the adapter 6 of the glass-ceramic material made under the trademark ZERODUR by Schott Glass Technologies.

The holder 8 is embodied in such a way that the support 7 is positioned stationarily in six degrees of freedom on the adapter 6, i.e. is held, or seated, in a statically defined manner. The holder 8 furthermore has the property that thermally caused different expansions of the support 7 and the adapter 6 are compensated. In order to achieve a high degree of measuring accuracy, the holder 8 must make possible a compensation in at least two of the coordinate directions X, Y which define the graduation plane.

An optimum structure for responding to thermal effects is achieved if compensation in all three coordinate directions X, Y, Z is made possible. Such an exemplary embodiment is represented in FIGS. 1 to 3 and will now be further explained.

The holder 8 has a spatial arrangement of solid state joints 81 to 86. Each of these solid state joints 81 to 86—also called flexible joints or flexures—has a weak point as the bending section. Each one of the solid state joints 81 to 86 is fastened on the support 7 with one section, and on the adapter 6 with another section, the bending section is located between. The rod-shaped solid state joints 81 to 86 each have a very great rigidity along the longitudinal axis of the rod direction, and little rigidity in directions normal to the longitudinal axis. The scanning plate 5 is not represented in FIG. 3 for better visibility of the solid state joints 81 to 86, and the support 7 is represented offset in the Z-direction in relation to the adapter 6. In order to assure free deflection normally to a direction along the longitudinal axis of the rod without a preferred direction, the bending section, which acts as a hinge, preferably has a round cross section.

The spatial arrangement of the solid state joints 81 to 86 has been selected to be such that the support 7 is fixedly seated on the adapter 6 in all three coordinate directions X, Y, Z. To this end, at least one solid state joint 81, 82, 83 respectively extends in a direction along the longitudinal axis of the rod in one of the coordinate directions X, Y, Z. Twisting around the coordinate axes X, Y, Z is blocked by the further solid state joints 83, 84, 86.

In detail, the solid state joint 81 extends in the X-direction and fixes, and thus blocks, the support 7 in the X-direction on the adapter 6. For a tie-down in the Y-direction, the solid state joint 82 extends in the Y-direction, and for a tie-down in the Z-direction the solid state joint 85 extends in the Z-direction.

Twisting around the Z-axis is prevented by arranging the further solid state joint 83 parallel with respect to the solid state joint 82, wherein the solid state joints 81, 82 and 83 are arranged on a plane parallel with respect to the graduation plane. Rotation around the X- and Y-axes is prevented by the spatially offset arrangement of three solid state joints 84, 85, 86 extending parallel with respect to the Z-direction.

The solid state joints 82, 83, 84, 85, 86 make possible a longitudinal extension of the support 7 in the X-direction, starting with the fixation of the support 7 by the solid state joint 81. The solid state joints 81, 84, 85, 86 make possible a longitudinal extension of the support 7 in the Y-direction, starting with the fixation of the support 7 by the solid state joints 82, 83. The solid state joints 81, 82, 83 make possible an extension of the support 7 in the Z-direction, starting with the fixation of the support 7 by the solid state joints 84, 85, 86. Thus, the solid state joints 81 to 86 are spatially arranged and designed in such a way that, on the one hand, they fix the support 7 in place stationarily in as vibration-stable manner as possible on the adapter 6 in all six degrees of freedom and, on the other hand, allow longitudinal extensions without transferring impermissible forces to the adapter 6, and therefore to the scanning graduation 51.

The represented arrangement of solid state joints 81 to 86 is only one of several possibilities. It has the advantage that the natural frequencies are especially high because of the platform-like structure of the support 7, which is located in the XY-plane.

An alternative arrangement is, for example, the provision of respectively two solid state joints extending parallel in relation to each other in each one of the axes X, Y, Z, which extend perpendicular on each other, wherein each of the two rod-like solid body joints, which extend parallel with respect to each other, defines a plane extending perpendicular in relation to the planes which are constituted by the two other pairs of solid state joints of the two other axes.

The holding function in the Z-direction can also be performed by solid state joints which compensate the thermally caused expansions of the support 7 in relation to the adapter 6 in the two coordinate directions X, Y. To this end, the solid state joints are for example embodied as leaf springs or leaf spring parallelograms. These leaf springs extend in the Z-direction which is to be blocked. Thus, one or several leaf springs are located in the XZ-plane and block movements of the support 7 in the directions X and Z, but permit expansion of the support 7 in the Y-direction. One or several leaf springs are located in the YZ-plane and block movements of the support 7 in the directions Y and Z, but permit expansion of the support 7 in the X-direction.

With all embodiments, the natural frequency of the scanning system should preferably lie above approximately 700 Hz.

The scanning system can be advantageously employed in connection with highly accurate position measurements in lithographic devices. In this case the first and second objects 3, 4 are preferably made of a material with a negligible coefficient of expansion, in particular a glass-ceramic material made under the trademark ZERODUR by Schott Glass Technologies, i.e., of the same material as the adapter 6 and the scale 2.

Figure 4:
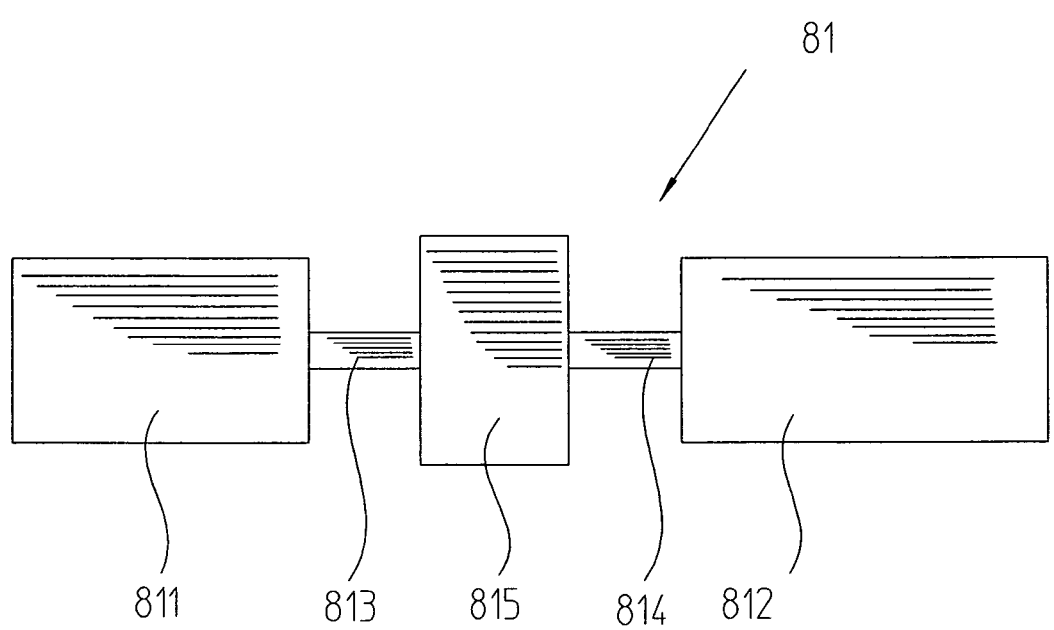
FIG. 4 shows an embodiment of a rod-shaped solid state joint to be used with the scanning system of FIG. 1 in accordance with the present invention.

A particularly advantageous embodiment of one of the solid state joints 81 of the solid state joints 81 to 86 is represented in detail in FIG. 4.

The solid state joint 81 has a first fastening section 811 for fastening on the adapter 6 and a second fastening section 812 for fastening on the support 7. Between these lies at least one rod-shaped bending section 813. For increasing rigidity in the rod direction, in the example two rod-shaped bending sections 813 and 814, which are spaced apart from each other in a direction along the longitudinal axis of the rod and are separated from each other by a non-bendable section in the form of a thickening or reinforcement 815, are located between the two fastening sections 811 and 812. These bending sections 813 and 814 preferably have a round cross section.

The foregoing description is provided to illustrate the present invention, and is not to be construed as a limitation. Numerous additions, substitutions and other changes can be made to the present invention without departing from its scope as set forth in the appended claims.

We claim:

1. A scanning system of a position measuring device for photo-electric scanning of a measuring graduation, the scanning system comprising:
    a support carrying measuring components;
    an adapter comprising a scanning graduation in a graduation plane; and
    a holder that holds said support on said adapter, wherein said holder is structured so that said support is stationarily positioned on said adapter in six degrees of freedom, but compensates thermally caused expansion of said support in relation to said adapter in a first coordinate direction and a second direction which define said graduation plane.

2. The scanning system in accordance with claim 1, wherein said holder compensates thermally caused expansion of said support relative to said adapter in a third coordinate direction perpendicularly with respect to said graduation plane.

3. The scanning system in accordance with claim 1, wherein said holder comprises a spatial arrangement of solid state joints.

4. The scanning system in accordance with claim 3, wherein each of said solid state joints are rod-shaped and are rigid along longitudinal axes of said joints, but can be deflected in directions perpendicular thereto.

5. The scanning system in accordance with claim 4, wherein each of said solid state joints have two bending sections extending in said respective longitudinal axis, said two bending sections are separated from each other by a non-bendable section.

6. The scanning system in accordance with claim 5, wherein each of said two bending sections has a round cross section.

7. The scanning system in accordance with claim 5, wherein at least one of said solid state joints extends in one of said first coordinate direction, said second coordinate direction and a third coordinate direction perpendicular to said first and second coordinate directions, and wherein said at least one of said solid state joints maintains said support rigidly on said adapter in said one of said first coordinate direction, said second coordinate direction and said third coordinate direction, but keeps said support deflectable in two other ones of said first coordinate direction, said second coordinate direction and said third coordinate direction.

8. The scanning system in accordance with claim 1, wherein said adapter is made of a material with a negligible coefficient of expansion.

9. The scanning system in accordance with claim 8, wherein said material is a glass-ceramic material.

10. The scanning system in accordance with claim 1, wherein said measuring components comprise optical components.

11. The scanning system in accordance with claim 10, wherein said optical components are lenses.

12. The scanning system in accordance with claim 10, wherein said support constitutes an enclosed receptacle, in whose interior said optical components are arranged.

13. The scanning system in accordance with claim 1, wherein said measuring components comprise electrical components.

14. The scanning system in accordance with claim 13, wherein said electrical components of said support are detector elements.

15. The scanning system in accordance with claim 13, wherein said support constitutes an enclosed receptacle, in whose interior said electrical components are arranged.

16. The scanning system in accordance with claim 1, wherein said support is arranged in a recess of said adapter.

17. A position measuring device comprising:
    a measuring graduation; and
    a scanning system for photoelectrically scanning said measuring graduation, said scanning system comprising:
    a support carrying measuring components;
    an adapter comprising a scanning graduation in a graduation plane; and
    a holder that holds said support on said adapter, wherein said holder is structured so that said support is stationarily positioned on said adapter in six degrees of freedom, but compensates thermally caused expansion of said support in relation to said adapter in a first coordinate direction and a second direction which define said graduation plane.

* * * * *